Dec. 24, 1968 G. A. BEASLEY 3,417,454
METHOD OF BLOCKING LENSES
Filed May 16, 1966 3 Sheets-Sheet 1

INVENTOR
GEORGE A. BEASLEY
BY
Kane, Dalimier, Kane & Smith
ATTORNEYS

Dec. 24, 1968  G. A. BEASLEY  3,417,454
METHOD OF BLOCKING LENSES
Filed May 16, 1966  3 Sheets-Sheet 3
FIG. 5
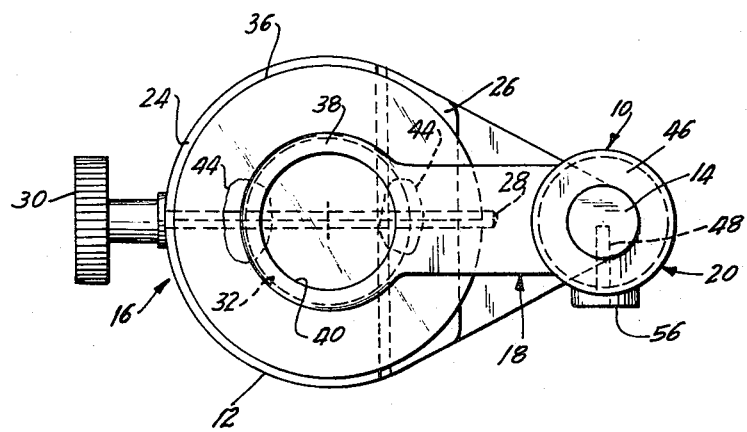
FIG. 6
FIG. 7
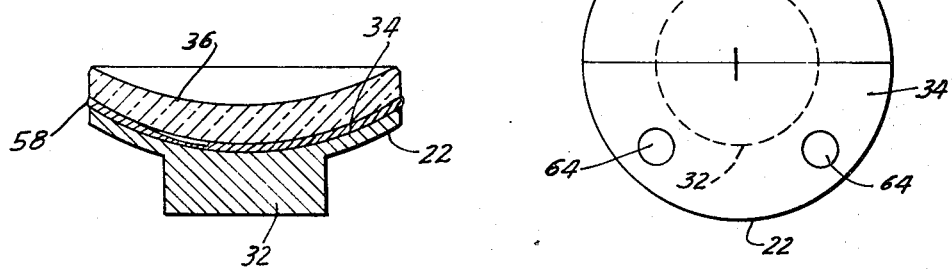
INVENTOR
GEORGE A. BEASLEY
BY
ATTORNEYS

United States Patent Office 3,417,454
Patented Dec. 24, 1968

3,417,454
METHOD OF BLOCKING LENSES
George A. Beasley, Fort Lauderdale, Fla., assignor to Univis, Inc., Fort Lauderdale, Fla., a corporation of Ohio
Filed May 16, 1966, Ser. No. 550,519
18 Claims. (Cl. 29—468)

The present invention relates to a method and apparatus for blocking lenses and, more particularly, to a method and apparatus for aligning and securing a plastic or glass lens blank to a block which may be of the type disclosed in commonly assigned U.S. Patent No. 3,140,568, granted July 14, 1964.

It is, therefore, a principal object of this invention to provide a method and apparatus for permitting the alignment of a lens blank and the selected block and while one of these units is clamped, introduce a bonding material between the block and the lens blank while preserving the aligned relationship therebetween without requiring the use of complex and costly mechanical devices for holding or clamping the other unit in the prescribed aligned relationship during the blocking operation or in accordance with any of the clamping or holding techniques commonly employed or known in the art.

Another object is to provide a method and apparatus of the above type which permits the lens blank to be displaced relative to the block following the attainment of the desired prescribed alignment therebetween in order that a bonding or blocking material may be applied to the block whereupon the lens blank is thereafter returned to its initial aligned relationship with the block in order that these two members may be secured together by means of the bonding material.

A further object is to provide a method and apparatus of the above type in which an improved indexing technique assures the preservation and attainment of the desired prescribed aligned relationship between the lens blank and block following the removal of the lens blank from the block and the introduction of the bonding material.

Briefly stated, the method and apparatus of this invention employs an adhesive material such as wax having adhesive properties for permitting a lens blank to be temporarily displaced or lifted off the block after the blank and block have been aligned in order to preserve this aligned relationship. The lens blank is then substantially automatically and accurately returned to its original aligning position whereupon the interposed bonding agent secures the lens blank and block together.

Other objects and advantages will become apparent from the following detailed description which is to be taken in conjunction with the accompanying drawings illustrating a somewhat preferred embodiment of the invention and in which:

FIG. 1 is a side elevational view of a blocker incorporating the teachings of this invention showning the lens blank pick-up arm in a raised position relative to a lower lens blank and spaced block clamped in position;

FIG. 2 is a similar side elevational view partly in section showing the lens black pick-up arm lowered following the alignment of the lens blank on the block with the bonding wax on the arm adhering to the lens blank to preserve the prescribed aligned relationship, the desired spaced relationship between the blank and block being first determined by the spacers and thereafter determined by the setting of the locking ring on the vertical standard;

FIG. 3 is a similar side elevational view partly in section showing the lens blank pick-up arm raised together with the lens blank adhered therto and the locking ring in a lowered fixed position at which point it serves as a stop for subsequent lowering of the arm and showing the selected bonding material for adhering the lens blank and block to one another applied to the concavity of the block and further showing the removal of the spacing means following setting of the locking ring;

FIG. 4 is a similar side elevational view partly in section showing the lens blank pick-up arm together with the lens blank adhered thereto in a lowered position determined by the setting of the locking ring such that the lens blank advantageously returns to its initial prescribed aligned position relative to the block with the applied bonding agent being interposed therebetween and in the space initially determined by the spacing means and set by the locking ring;

FIG. 5 is a top plan view of the blocker;

FIG. 6 is a cross-sectional view of the blocked lens removed from the blocker; and FIG. 7 is a top plan view of a blocked lens illustrating another form of spacer which may be embedded in the bonding agent between the blank and block or removed prior to the application of the bonding agent.

Figure 2:
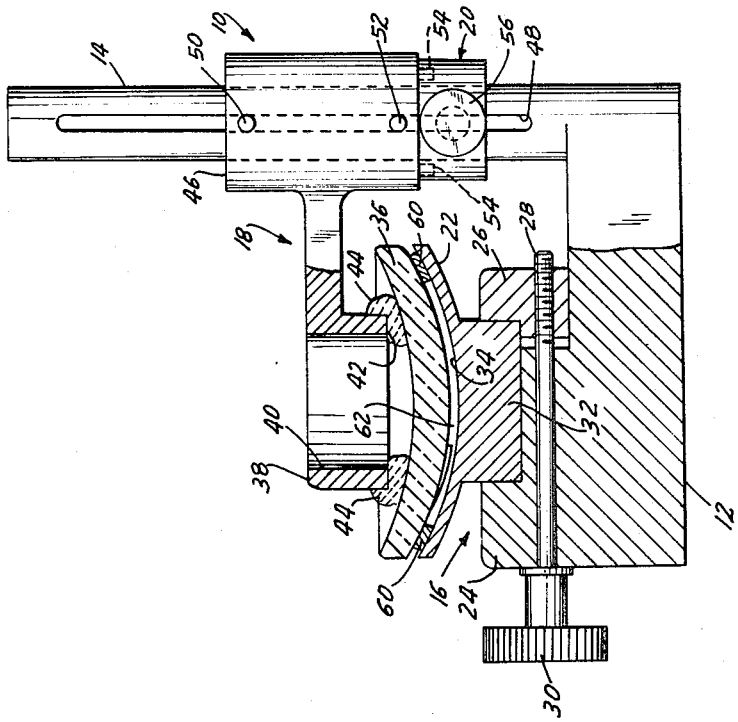
Figure 1:
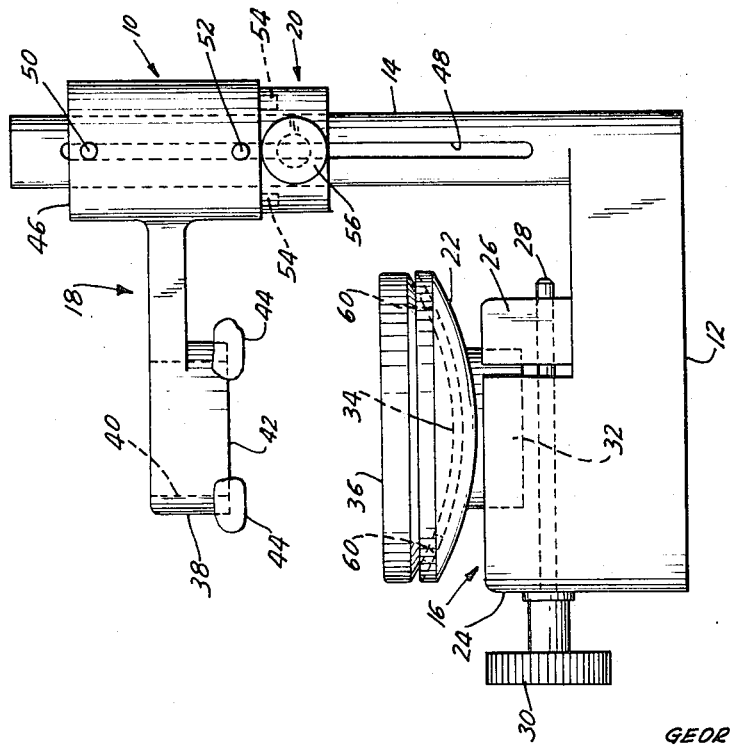

In the drawings, a blocker 10 is illustrated and includes a base 12 and upstanding standard 14 which may assume a rod or bar-like configuration. A block clamp 16 forms part of the base 12 and a lens blank pick-up arm 18 and locking ring 20 are both slidably supported on the standard 14.

The clamp 16 serves to conveniently hold block 22 during the blocking operation. In this connection, the clamp 16 includes a stationary jaw 24 and a movable jaw 26 which are adapted to be shifted towards and away from one another by means of the threaded screw 28 extending through the stationary jaw 24 into a tapped opening in the movable jaw 26. A handle or knob 30 facilitates the turning of the screw 28 such that counter-clockwise rotation of the screw opens the jaws 24 and 26 whereas clockwise rotation of the screw will close the jaws firmly about the block 22 and, more particularly, the reduced boss 32 thereof. In this manner, the concave face 34 of the block will be facing upwardly for reception of the lens blank 36 and a bonding agent to be described in detail shortly. It should be understood that this invention contemplates the clamping of the lens blank 36 in a similar manner and the lowering of block 22 in aligned relationship thereon.

The lens blank pick-up arm 18 is adapted to be shifted between a raised position and a lowered position on the standard 14 along a somewhat fixed and predetermined path of travel for purposes of lifting the aligned lens blank 36 off of the clamped block 22 while preserving or retaining the prescribed aligned relationship between the blank and block. Towards this end, the lens blank pick-up arm 18 is provided with a substantially tubular head 38 having a substantially central opening 40 through which the lens 36 may be visually aligned with the block 22. The lower edge or rim 42 of the head 38 has applied thereto a firm moldable material having adhesive properties and bonding affinity for both the head 38 and the lens blank 36. A form of modeling wax with adhesive properties has proven to be satisfactory. An adhesive wax possessing the desired properties is obtainable commercially under the name Flexo Wax C, supplied by Glyco Chemicals, Inc., New York, N.Y. This specific material is a non-crystalline hydrocarbon with high adhesive properties. This material and similar contemplated materials advantageously conform to the contour of the rim 42 and surface of the lens blank 36 with the desired degree of adherence and firmness. Two or more pieces of the wax 44 may be applied to the rim 42 or, for that matter, it may be applied to the entire peripherally extending rim surface. Where the head 38 is other than tubular, a single enlarged piece of wax may be employed.

The predetermined path of travel of the lens blank pick-up arm 18 may be obtained in a number of ways including a hinge arrangement. As shown in the illustrated embodiment, the lens blank pick-up arm 18 may be provided with a collar 46 telescoped over the standard 14. The standard 14 is provided with an elongated substantially vertically extending slot 48 which conveniently receives a pair of guide pins 50 and 52 fixed to the collar 46. Naturally, other forms of keying means may be employed to permit vertical shifting of the lens blank pick-up arm 18 relative to the standard 14 but prevent lateral movement therebetween.

A locking ring 20 is adapted to be not only shiftable with the lens blank pick-up arm 18 but is also adapted to be disassociated therefrom for purposes of serving as a stop therefor in determining its lowermost position. In this connection, magnets 54 on either the collar 46 or ring 20 facilitate the movement of the ring with the arm 18. The force of attraction between these parts offered by the magnets is adapted to be overcome whereby the ring 20 is shiftable independently of the arm 18. This is particularly desirable when the head 18 is lowered for purposes of adhering the bonding wax 44 to the lens blank 36 which in turn has been aligned with the clamped block 22 all in the manner typified by FIG. 2. At this point, the ring 20 is adapted to be clamped to the standard 14 by means of the set screw 56. Turning the set screw 56 in one direction will secure or key the ring 20 in place on the standard 14 and turning of the set screw 56 in the opposite direction will permit its travel with the arm 18.

In order to secure the lens blank 36 to the block 22, a suitable bonding agent is employed which may be selected from the group consisting of low melting point alloy, pitch, wax or other suitable materials or materials well known in the art. This bonding agent 58 is preferably applied in a manner typified by FIG. 3 to the concave face 34 of the block 22 after the aligned lens blank 36 has been removed while preserving the prescribed aligned relationship but also after the desired amount of spacing is assured between the blank 36 and block 22. This spacing is illustrated in FIG. 2 and may be obtained by the deployment of suitable spacing means which may take the form of an annular or ring type spacer 60. This spacer 60 thus provides a cavity 62 between the lens blank 36 and block 22 for accommodation of the bonding agent 58. As illustrated in FIG. 7, the spacing means may assume the form of tabs or discs 64 of substantially equal thickness which can be mounted on the concave face 34 of the block 22 and left in place following the application of the bonding agent 58. These spacer tabs 64 maintain a uniform space between the lens blank 36 and block 22 so that during the subsequent generating and grinding operations, thickness and optical center position can be maintained by referencing through the back surface of the block 22. Of course, the spacing means may assume the form of the fixed rim or raised pins or tabs on the lens block, as disclosed in U.S. Patent No. 3,140,568. However, the preferred spacing means is the annular ring spacer 60 which is adapted to be removed immediately prior to the application of the bonding agent 58. In this manner, the removable spacer 60 may be used over again. The removal of the spacer 60 also provides an unbroken surface for the bonding agent 58 which eliminates the possibility of leaving imprints on the lens blank surface particularly in the case of plastic lenses.

Figure 4:
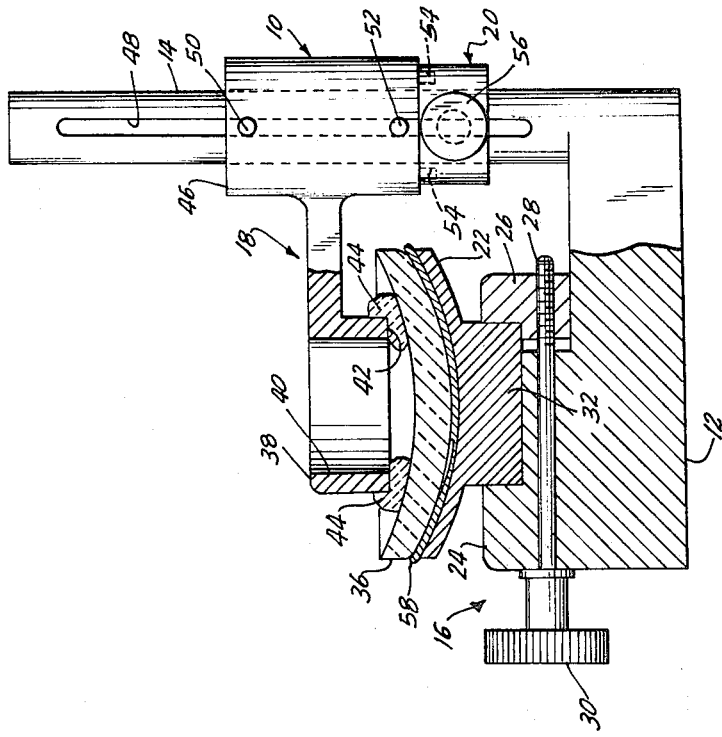
Figure 3:
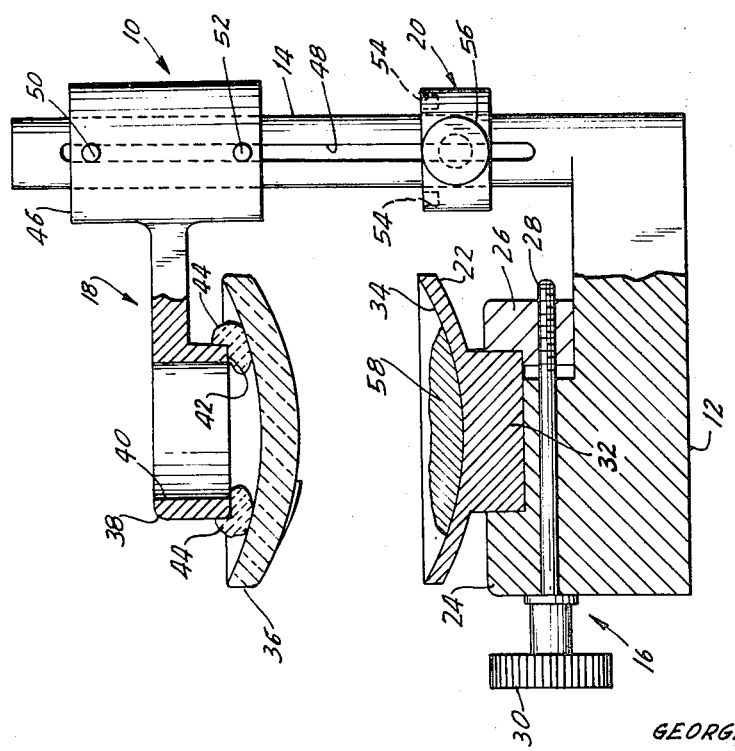

When employing the tabs 64, it was found to be unnecessary to use the locking ring 20 to determine the extent of the lowered position of the lens blank pick-up arms 18 and blank 36 adhered thereto because the spacer taps 64 hold the lens blank 36 at the proper distance from the block 22. However, when the reusable spacer 60 is employed, the locking ring 20 is fixed relative to the standard 14 by turning the set screw 56 after the lens pick-up arm 18 has been lowered and the bonding wax 44 impressed and adhered to the concave face of the lens blank 36, as illustrated in FIG. 2. Following the setting of the locking ring 20, the lens blank pick-up arm 18 and lens blank 36 are raised and the spacer 60 is then removed. The selected bonding agent 58 is then applied to the concave face 34 of the block 22, as shown in FIG. 3. The lens blank pick-up arm 18 together with the lens blank 36 is then lowered until stopped by the locking ring 20 to thereby attain the initial desired spaced-apart relationship between the lens blank 36 and block 22 at which point the convex surface of the lens blank contacts the bonding agent 58 for ultimate adherence to the block 22, as shown in FIG. 4.

Depending on subsequent processing requirements, the blank may be marked-up with cylinder axis, horizontal axis, optical center and mechanical center references. The lens block 22, which may assume the form of that disclosed in U.S. Patent No. 3,140,568, is placed between the open jaws 24 and 26 of the clamp 16 and then clamped in place. Assuming the temporary and reusable spacer 60 is employed, a spacer 60 is then placed on the concave surface 34 of the block 22. The marked lens blank 36 is placed on the spacer 60 and visually aligned with the alignment marks that are on the block 22, (see FIGS. 5 and 7). The lens blank pick-up arm 18, which may be retained in its elevated position by means of suitable latching means (not shown), is lowered. The bonding wax 44, which has been previously applied to the rim 42 of the head 38, firmly attaches itself to the concave surface of the lens blank 36. The locking ring 20, which is now in an unlocked position and capable of being shifted with the lens blank pick-up arm 18 through the interposed magnets 54, is then locked into place by turning the set screw 56. In this manner, when the lens blank pick-up arm 18 is raised and again lowered, the locking ring 20 will act as a stop thereby assuring the return of the lens blank 36 to its original seating position. The lifting head 38 is then raised, lifting with it the lens blank 36 which is held thereto by the interposed wax 44. A strippable protective coating or tape, well known in the art, may at this time be applied to the convex face of blank 36. The spacer 60 is removed and the selected bonding agent 58 is poured or otherwise suitably applied to the concave face 34 of the block 22. The lens blank pick-up arm 18 is again lowered against the set stop ring 20 to attain the desired spaced apart relationship between the lens blank 36 and block 22. When this occurs, the bonding agent will occupy the cavity 62 to bond the lens blank 36 and the block 22 together. In this manner, the lens blank 36 will assume its original alignment position at which the convex surface thereof is uniformly spaced relative to the concave surface 34 of the block 22 and also at which the optical center and cylindrical axis of the lens blank 36 assumes the prescribed alignment with the corresponding marks on the block. Following the setting or hardening of the bonding agent 58, the lens blank pick-up arm 18 is raised to release the wax 44 from the concave surface of the lens blank 36. The blocked lens blank is then removed from the clamp 16 and may now be further processed which could be in accordance with the teachings of U.S. Patent No. 3,140,568.

Thus, the aforenoted objects and advantages are most effectively attained. Although several somewhat preferred embodiments of the invention have been disclosed and described herein in detail, it should be understood that this invention is in no sense limited thereby and its scope is to be determined by that of the appended claims.

I claim:

1. A method of blocking a lens blank whereby a lens blank holding and aligning block unit and a lens blank unit are secured and aligned one wtih respect to the other, said method comprising:
   positioning one of the units on a support;
   positioning and aligning the other of the units relative to the one unit;
   temporarily fixing the aligned relationship of the units by applying a bonding wax to a surface of one of the units and this unit is removed from the other, while preserving the fixed aligned relationship by gripping the wax, by a structure shiftable along a predetermined path such that the units are adapted to be returned to the aligned relationship following the interposition of the bonding agent by simply shifting the structure and consequently the removed unit adhered thereto by the bonding wax;

removing one unit from the other while preserving the fixed aligned relationship;

interposing a bonding agent on one of the units;

returning the units to the aligned relationship;

and securing the units to one another in the aligned relationship by the interposed bonding agent.

2. A method of blocking a lens blank whereby a block and lens blank are secured and aligned in a prescribed relationship, said method comprising:

clamping the block on a support;

positioning the lens blank on the block;

aligning the lens blank on the block according to said prescribed relationship;

shifting a structure having a bonding wax thereon along a predetermined path of travel between a first position removed from the lens blank to a second position adjacent the lens blank at which the bonding wax adheres to the lens blank;

shifting the structure to its first position to consequently remove the lens blank from the block by means of the interposed bonding wax to thereby preserve the prescribed aligned relationship;

applying a bonding agent to the block having bonding affinity for both the block and the lens blank; and shifting the structure and consequently the lens blank from the first position to the second position at which the lens blank adheres to the block by the bonding agent.

3. The invention in accordance with claim 2 wherein the block includes a concave surface and the lens blank includes a concave surface and a convex surface, the block is clamped with its concave surface facing upwardly and the lens blank is positioned thereon with its convex surface adjacent the concave surface of the block and its concave surface facing upwardly.

4. The invention in accordance with claim 2 wherein the lens blank is positioned on the block in spaced relationship thereto by means of interposed spacing means prior to temporarily fixing the prescribed relationship between the lens blank and block to provide a concavity therebetween for accommodating the bonding agent.

5. The invention in accordance with claim 4 wherein the spacing means is removed after the prescribed relationship is temporarily fixed and before the bonding agent is applied.

6. The invention in accordance with claim 2 wherein the structure traverses a linear path of travel in a substantially vertical direction between its first and second positions.

7. The invention in accordance with claim 2 wherein the second position of the structure is set when the structure is shifted adjacent the lens blank to secure the lens blank thereto by means of the interposed bonding agent so that when the structure and secured lens blank are shifted to the first position they will be adapted to be returned precisely to the set second position at which the interposed bonding agent secures the lens blank to the block.

8. The invention in accordance with claim 7 wherein the lens blank is positioned on the block in spaced relationship thereto by means of an interposed spacing means to provide a concavity for the bonding agent and following setting of the second position of the structure, the interposed spacing means is removed and when the set second position is reached, the lens blank will be spaced from the block with only the bonding agent interposed therebetween.

9. The invention in accordance with claim 2 wherein following the securement of the lens blank to the block by means of the interposed bonding agent, the block is unclamped and the lens blank is removed from the bonding wax to thereby provide a blocked lens blank for further processing.

10. Apparatus for blocking a lens blank whereby a lens blank holding and aligning block unit and a lens blank unit are secured and aligned one with respect to the other, said apparatus comprising:

clamping means for clamping one of the units;

means for facilitating the positioning and aligning of the other of the units relative to the one unit;

a shiftable member adapted to be shifted along a predetermined path from a first position spaced from the aligned units to a second position adjacent thereto;

shifting means for shifting the member along the predetermined path between the first and second positions;

the member having bonding means thereon for bonding one of the units thereto when the member is shifted to the second position to thereby preserve the aligned relationship between the units when the member is shifted to its first position at which time a bonding agent is adapted to be interposed between the units and the units secured to one another thereby in the aligned relationship upon subsequent shifting of the member back to the second position.

11. Apparatus for blocking a lens blank whereby a lens blank and block are adapted to be secured and aligned to one another according to a prescribed relationship, said apparatus comprising:

clamping means for temporarily clamping said block;

means for facilitating the positioning and aligning of the lens blank on the block;

a shiftable member adapted to be shifted along a predetermined path from a first position spaced from the lens blank to a second position adjacent thereto;

shifting means for shifting the member along the predetermined path between the first and second positions;

and bonding means operatively associated with the member for bonding the lens blank to the member when the member is shifted to the second position to thereby preserve the aligned relationship between the lens blank and block when the member and lens blank bonded thereto is shifted to the first position at which time a bonding agent is adapted to be applied to the block and the lens blank secured to the block by the bonding agent in the prescribed aligned relationship upon subsequent shifting of the member back to the second position.

12. The invention in accordance with claim 11 wherein the block includes a concave surface and the lens blank includes a convex surface and a concave surface, the clamping means including surfaces cooperable with surfaces of the block for disposing the concave surface of the block in a substantially upwardly facing position such that the convex surface of the lens blank is adapted to be positioned adjacent thereto with the concave surface of the lens blank facing upwardly.

13. The invention in accordance with claim 11 wherein the member is tubular including an opening therethrough for permitting the lens blank to be visually aligned with the block.

14. The invention in accordance with claim 11 wherein the bonding means is selected from the group consisting of adhesive waxes having bonding affinity for both the material of the member and lens blank.

15. The invention in accordance with claim 11 wherein said shifting means includes a standard and a collar shiftably telescoped on the standard and connected with the member.

16. The invention in accordance with claim 15 wherein adjustable stop means are on the standard for being engaged by the collar for determining the second position of the member.

17. The invention in accordance with claim 16 wherein spacing means are adapted to be interposed between the lens blank and block for providing a space therebetween and following shifting of the lens blank incident to the shifting of the member from the second position to the first position, the spacing means is adapted to be removed prior to the placement of the bonding agent on the block and the space between the lens blank and block is adapted to be maintained when the member is shifted from the first position back to the second position upon the engagement of the stop means by the collar.

18. The invention in accordance with claim 16 where in said standard is provided with an elongated slot and the collar is provided with projecting pins adapted to travel in the slot for determining the said predetermined path of travel of the member.

References Cited
UNITED STATES PATENTS

| | | | |
|---|---|---|---|
| 1,538,651 | 5/1925 | Pellow | 51—284 |
| 1,911,153 | 5/1933 | Hill | 51—284 |
| 2,224,168 | 10/1940 | Tillyer et al. | 51—216.2 |
| 3,075,870 | 1/1963 | Hedler et al. | 264—262 |
| 3,113,347 | 10/1963 | Kufrovich | 156—242 X |
| 3,140,568 | 7/1964 | Beasley | 51—216.2 |
| 3,355,342 | 11/1967 | Lanman | 51—284 X |
| 3,274,662 | 9/1966 | Jackman et al. | 156—556 X |

CHARLIE T. MOON, *Primary Examiner.*

U.S. Cl. X.R.

29—473.1, 497.5, 501, 559; 51—216, 284; 156—295, 556; 264—262; 228—49